Patented Oct. 11, 1932

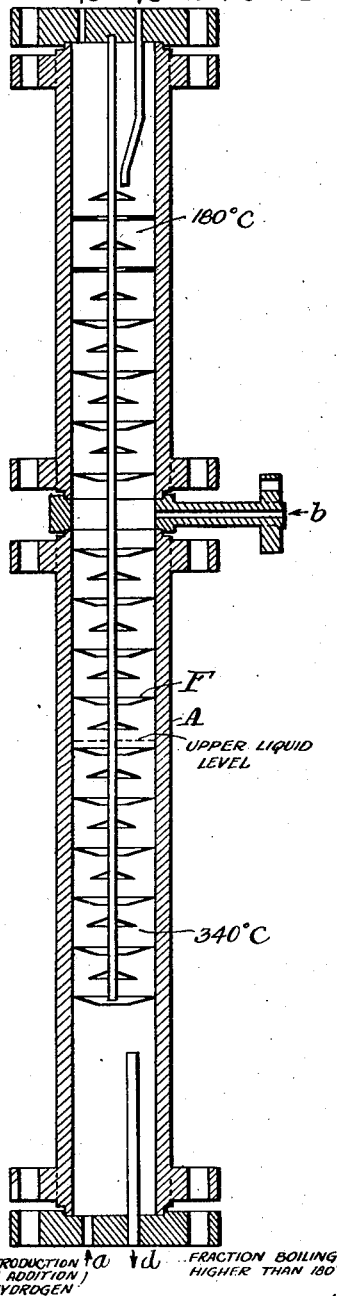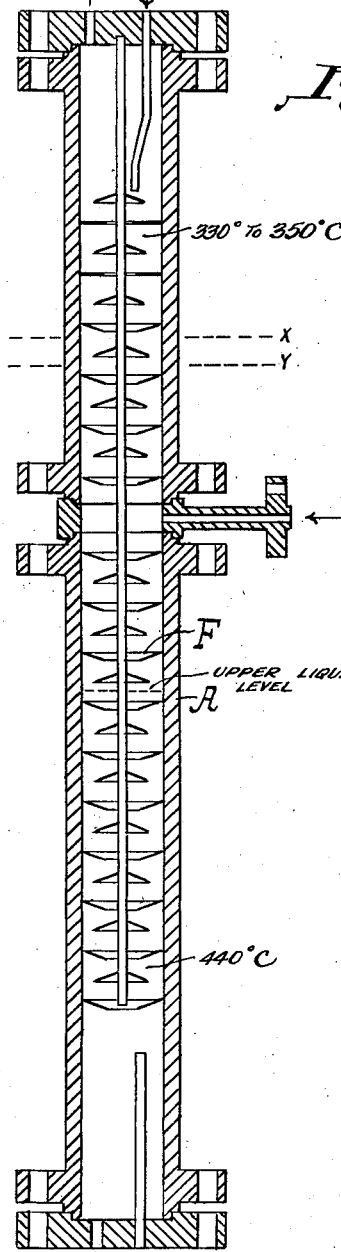

1,881,969

UNITED STATES PATENT OFFICE

MATHIAS PIER, OF HEIDELBERG, AND KURT WISSEL, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

RECOVERY OF REFINED PRODUCTS FROM DISTILLABLE CARBONACEOUS MATERIALS

Application filed July 27, 1929, Serial No. 381,457, and in Germany August 15, 1928.

This invention relates to improvements in and apparatus for the recovery of refined products from distillable carbonaceous materials, such as various kinds of coal, tars, mineral oils, their distillation and extraction products, residues and the like.

We have found that reaction products issuing from a destructive hydrogenation treatment of distillable carbonaceous materials, such as various kinds of coal, tars, mineral oils and the like with hydrogen at elevated temperatures and under pressure or from a treatment by extraction under pressure of bituminous materials, such as various kinds of coal, are advantageously resolved into the different fractions by passing gases or vapors through the said reaction products, either in the same direction or in counter-current or both, or by separating the gaseous or vaporous products leaving the reaction chamber without previous condensation by external cooling, by means of gases or liquids, that is to say fluids, flowing in opposite direction. Destructive hydrogenation and extraction treatments under pressure are hereinafter referred to collectively for the sake of brevity as "heat treatments of distillable carbonaceous materials under pressure". It is thus clear, that the said separation is always in part carried out in the vaporous phase. The fluid introduced may, for example be a liquid comprising hydrocarbons of a boiling point intermediate between those of the fractions to be separated.

When working with liquids it is preferable to employ either the oils which form the initial materials or the condensed heavy fractions, obtained in the course of the process, for the separation. The fractionation can be carried out by employing several columns, in which case the temperature prevailing in the single columns is regulated according to the products to be recovered. In each column, products having a definite boiling point range are recovered. The products which are not carried over during the fractionation can be drawn off, for example, at the bottom of the column. These are allowed to flow together with the heavy condenser constituents into a reservoir and if desired can be led back into the reaction vessel for a fresh treatment with hydrogen. When working with gases or vapors, the waste gases from the destructive hydrogenation or the gaseous or vaporous products, remaining after the separation of the liquid products by condensation, can be employed either in the same direction or in counter-current. The gases or vapors can be blown directly through the reaction products to be separated. The gases or vapors can also be led through tubes arranged in the said fractionating columns, round which the materials to be fractionated pass and thus indirectly carry out the desired fractionation. The gases or vapors necessary for the fractionation can similarly be pumped in a cycle. When choosing the temperature for the fractionation the total pressure in the apparatus, the partial pressure of the product to be obtained by the fractionation, and the boiling point range of the desired final products must all be taken into account.

By the process in accordance with the present invention, if desired, a far reaching separation of the products of low boiling point from the material to be employed for the hydrogenation can be effected even before entry into the reaction chamber, either by employing the initial material as a cooling liquid or for example by introducing it into the fractionating column and allowing it to trickle in counter-current to the gases or vapors flowing therethrough.

It is very advantageous to introduce the material to be resolved into fractions in the middle of the said column, and to introduce a liquid medium at the top of the said column and a hydrogenating gas at the bottom of said column. By virtue of the fact that the heavy hydrocarbons in the lower part of the column are subjected to cracking conditions, the hydrogenating gas prevents carbonization of said hydrocarbons.

The process in accordance with the present invention causes a sharp separation of the reaction products obtained by an hydrogenation into constituents of high boiling point, and constituents of low boiling point. The said process has the advantage that the heat of the products obtained in the process is completely utilized, especially in cases when direct contact between the products of low boiling point and the material which has not yet been hydrogenated occurs. In the working up of liquid initial materials, such as tar, mineral oils and the like it is not necessary to remove the residues, since the whole of the initial materals can be converted completely into valuable products. By returning the middle oils which are separated in the process directly to the reaction vessel and only recovering the benzines, there is the advantage that the manufacture is rendered less troublesome and is simplified in particular by dispensing with a part of the distillation. Moreover, according to the present process it is possible among other things to separate middle oils and benzines in a simple manner, whereas this separation is usually accompanied by great difficulty. The said fractionation may, if desired, be carried out under pressure, for example without releasing the pressure on the reaction products. The accompanying drawing represents vertical sections of apparatus embodying this invention.

The following examples will further explain how the said invention may be carried out in practice, reference being made to the accompanying drawing which illustrates apparatus according to this invention, but the invention is not restricted to these examples.

Example 1

Reference is made to Figure 1.

A topped American oil, of which about 40 per cent boils up to 350° C., is treated at from 450° to 460° C. and at a pressure of 200 atmospheres with hydrogen and a catalyst prepared from molybdic acid and zinc oxide in a high-pressure reaction vessel. 80 per cent of the hydrogenation product obtained boils up to 350° centigrade whilst 20 per cent boils at higher temperatures. In order to obtain a uniform oil boiling up to 350° centigrade, the product leaving the hydrogenation vessel is introduced at a temperature of about 450° C. into a column A, containing a number of staggered baffle plates F, together with the hydrogenating gas at $a$, while at the same time initial material which has not yet been hydrogenated and has a temperature of about 300° C. is introduced at $c$. The opening $b$ is kept closed. The liquid level in the tower is indicated. The temperature is dependent on the partial pressure of the product to be recovered, and in the lower part of the column amounts to about 440° C. and in the upper part to from about 330° to 350° C. The product leaving the column together with the gas at $e$ after cooling boils almost entirely up to 350° C., whilst the product drawn off at $d$ contains only a small quantity, if any, of constituents boiling up to 350° C. A pressure of about 200 atmospheres is maintained in the tower. This product is then led back into the hydrogenation chamber again.

Example 2

Reference is made to Figure 2.

A middle oil which boils between 200° and 325° C. obtained by the destructive hydrogenation of coal is treated with hydrogen at from 460° to 480° C. and at 200 atmospheres in the presence of a catalyst prepared from molybdic acid. The reaction product thus obtained, which contains about 55 per cent of constituents which boil up to 180° C., is pumped together with the hydrogenating gas at a temperature of about 350° C. into the column at $b$, whilst additional gas having a temperature of about 350° C. flows in at $a$. A heavy benzine, from which it is desired to separate the fraction which boils below 180° C. (about 35 per cent) and which has a temperature of about 170° C. is introduced at $c$. The temperature in the column amounts to about 340° C. in the lower part and about 180° C. in the upper part. From 95 to 99 per cent of the product leaving the column at $e$ boils up to 180° C., whilst the product drawn off at $d$ contains a very small quantity or even no constituents at all boiling up to 180° C. A pressure of about 200 atmospheres is maintained in the tower.

What we claim is:

1. In a process for destructively hydrogenating distillable hydrocarbon materials, the steps of discharging the reaction products of the destructive hydrogenation into a fractionating zone under substantially the pressure of the destructive hydrogenation process, introducing a cooler oil at the upper end of said zone to condense a part of the vaporized products of said reaction products under rectifying conditions, and introducing a hydrogenating gas at the opposite end of said zone to assist in a vaporization of part of said oil and prevent carbonization, withdrawing vaporized low boiling products and hydrogen at the upper end of said zone and heavy hydrocarbons at the lower end of said zone.

2. In a process for destructively hydrogenating distillable hydrocarbon materials under a temperature and pressure suitable for destructive hydrogenation, the steps of discharging the reaction products of the destructive hydrogenation into a fractionating zone at substantially the same temperature and pressure as those prevailing in the destructive hydrogenation process, introducing a cooler oil into the upper end of said zone to condense a part of the vaporized products of said reaction products under rectifying conditions, introducing a hydrogenating gas into the opposite end of said zone to assist in a vaporization of part of the oil and prevent carbonization, withdrawing vaporized low boiling hydrocarbons from the upper end of said zone and heavy hydrocarbons at the lower end of said zone and destructively hydrogenating said heavy hydrocarbons.

3. The process as defined in claim 2 wherein the hydrogenating gas is separated from the vaporized products withdrawn at the top of the zone and returned into said zone at the bottom thereof.

4. In a process for destructively hydrogenating a liquid hydrocarbon material at a temperature and pressure suitable for destructive hydrogenation, the steps of discharging the reaction products of said destructive hydrogenation into the middle of a fractionating zone at a temperature and pressure substantially the same as that employed in the destructive hydrogenation, introducing a cooler oil similar to that destructively hydrogenated into the upper end of said zone to condense a part of the vaporized products of said reaction products under rectifying conditions, introducing a hydrogenating gas into the lower end of said zone to assist in a vaporization of a part of said oil and prevent carbonization, withdrawing vaporized low boiling hydrocarbons at the upper end of said zone and heavy hydrocarbons at the lower end of said zone, and returning said heavy hydrocarbons to the destructive hydrogenation process.

5. The process defined in claim 4 wherein the reaction products are introduced at a temperature of about 450° C. and a pressure of 200 atmospheres, the vaporized hydrocarbon products withdrawn at the top of the zone have a boiling point up to 350° C. and the heavy hydrocarbons withdrawn at the lower end of the zone a boiling point above 350° C.

In testimony whereof we have hereunto set our hands.

MATHIAS PIER.
KURT WISSEL.